(12) United States Patent
Baldemair et al.

(10) Patent No.: US 9,462,531 B2
(45) Date of Patent: Oct. 4, 2016

(54) NETWORK NODE AND A METHOD FOR SHORTCUTTING A COMMUNICATION PATH BETWEEN USER EQUIPMENTS

(71) Applicant: Telefonaktiebolaget L M Ericsson (publ), Stockholm (SE)

(72) Inventors: Robert Baldemair, Solna (SE); Jonas Kronander, Knivsta (SE); Fredrik Lindqvist, Järfälla (SE); Gunnar Mildh, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/430,385

(22) PCT Filed: Sep. 24, 2012

(86) PCT No.: PCT/SE2012/051009
§ 371 (c)(1),
(2) Date: Mar. 23, 2015

(87) PCT Pub. No.: WO2014/046585
PCT Pub. Date: Mar. 27, 2014

(65) Prior Publication Data
US 2015/0245274 A1    Aug. 27, 2015

(51) Int. Cl.
*H04W 40/02* (2009.01)
*H04W 40/24* (2009.01)
*H04W 84/22* (2009.01)
*H04W 40/34* (2009.01)
*H04W 76/02* (2009.01)

(52) U.S. Cl.
CPC ............ *H04W 40/02* (2013.01); *H04W 40/24* (2013.01); *H04W 84/22* (2013.01); *H04W 40/34* (2013.01); *H04W 76/023* (2013.01)

(58) Field of Classification Search
CPC ... H04W 40/02; H04W 40/24; H04W 40/34; H04W 76/023; H04W 84/22
See application file for complete search history.

(56) References Cited

U.S. PATENT DOCUMENTS

| 7,606,175 B1 | 10/2009 | Maufer |
| 2008/0144587 A1* | 6/2008 | Gupta ................. H04W 40/248 370/338 |

(Continued)

FOREIGN PATENT DOCUMENTS

WO     2009024508 A1    2/2009

OTHER PUBLICATIONS

Hui, S. Y. et al., "Cost Evaluation on Secure Routing Over Powerlines for WMNs", IEEE International Conference on Parallel and Distribution Systems, Piscataway, New Jersey, USA, Dec. 5, 2007, 1-7.

(Continued)

*Primary Examiner* — Kenneth Lam
(74) *Attorney, Agent, or Firm* — Murphy, Bilak & Homiller, PLLC

(57) ABSTRACT

A first network node (NN) (110) and a method for shortcutting a communication path between a first user equipment (UE) (120) and a second UE (122). When information about the second UE is in a set of information, which set of information (110S) comprises information about one or more downstream reachable UEs (120,122), and when the second UE is connected to the first NN, the data is transmitted to the second UE, whereby the path is shortcut. Furthermore, when information about the second UE is in the set of information and when a third NN (114) is downstream connected to the first NN, the data is transmitted to the third NN, whereby the path is shortcut.

10 Claims, 12 Drawing Sheets

(56) References Cited

U.S. PATENT DOCUMENTS

| | | | |
|---|---|---|---|
| 2011/0205959 A1* | 8/2011 | Aalto | H04L 45/00 370/328 |
| 2011/0235595 A1* | 9/2011 | Mehta | H04W 8/082 370/329 |
| 2012/0082161 A1* | 4/2012 | Leung | H04L 12/4633 370/392 |
| 2014/0198655 A1* | 7/2014 | Ishii | H04W 76/023 370/235 |

OTHER PUBLICATIONS

Uemori, Takahide et al., "A Routing ID-based Node-disjoint Multipath Scheme for Ad Hoc Networks", IEEE 2012 9th International Conference on Ubiquitous Intelligence and Computing and 9th International Conference on Autonomic and Trusted Computing, Sep. 4, 2012, 621-626.

* cited by examiner

NETWORK NODE AND A METHOD FOR SHORTCUTTING A COMMUNICATION PATH BETWEEN USER EQUIPMENTS

TECHNICAL FIELD

Embodiments herein relate to a first network node and to a method therein. In particular, embodiments herein relate to the shortcutting of a communication path between a first user equipment and a second user equipment.

BACKGROUND

Communication devices such as User Equipments (UE) are enabled to communicate wirelessly in a radio communications system, sometimes also referred to as a radio communications network, a mobile communication system, a wireless communications network, a wireless communication system, a cellular radio system or a cellular system. The communication may be performed e.g. between two user equipments, between a user equipment and a regular telephone and/or between a user equipment and a server via a Radio Access Network (RAN) and possibly one or more core networks, comprised within the wireless communications network.

User equipment are also known as e.g. mobile terminals, wireless terminals and/or mobile stations, mobile telephones, cellular telephones, or laptops with wireless capability, just to mention some examples. The user equipments in the present context may be, for example, portable, pocket-storable, hand-held, computer-comprised, or vehicle-mounted mobile devices, enabled to communicate voice and/or data, via the RAN, with another entity.

The wireless communications network covers a geographical area which is divided into cell areas, wherein each cell area being served by a network node such as a Base Station (BS), e.g. a Radio Base Station (RBS), which sometimes may be referred to as e.g. eNB, eNodeB, NodeB, B node, or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. Further, each base station may support one or several radio access and communication technologies. The base stations communicate over the radio interface operating on radio frequencies with the user equipments within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: GroupeSpécial Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

According to 3GPP/GERAN, a user equipment has a multi-slot class, which determines the maximum transfer rate in the uplink and downlink direction. GERAN is an abbreviation for GSM EDGE Radio Access Network. EDGE is further an abbreviation for Enhanced Data rates for GSM Evolution.

A Super Dense Network (SDN) is defined as a set of SDN nodes building up a local network connected via wireless backhaul to a backbone network node that acts as an aggregation node i.e., is connected to a fibered/wired backbone network. In this description, the wireless backhaul is the wireless connections, i.e. the communication paths, between all network nodes comprised in the local network.

Using this definition a SDN may for example be a set of SDN nodes providing high capacity mobile broadband access in a corridor or a shopping mall.

Assume that the SDN comprises a capacity sharing scheme that enables an end user device, e.g. a user equipment, to share the available backbone resources fairly between all connected end user devices. However, if the SDN network is deployed using wireless backhaul then there will be a capacity bottleneck at aggregation nodes or at SDN nodes near the aggregation nodes. Further, such approach implies that the backhaul capacity is underutilized near leaf nodes, i.e. near SDN nodes with multiple wireless backhaul hops to the aggregation node.

SUMMARY

An object of embodiments herein is to provide a way of improving the performance in a communications network.

According to a first aspect of embodiments herein, the object is achieved by a method in a first network node for shortcutting a communication path between a first user equipment and a second user equipment. The first network node, the first and second user equipments are comprised in a communications network. Further, the first network node is configured to communicate upstream and downstream in the communications network.

When information about the second user equipment is in a set information, which set of information comprises information about downstream reachable user equipments of the first network node, which first network node has received data destined for the second user equipment from the first user equipment, and when the second user equipment is connected to the first network node, first network node transmits the data to the second user equipment, whereby the communication path between the first user equipment and the second user equipment is shortcut. Alternatively, when information about the second user equipment is in the set of information and when a third network node is downstream connected to the first network node and arranged in the communication path between the first network node and the second user equipment, first network node transmits the data to the third network node, whereby the communication path between the first user equipment and the second user equipment is shortcut.

According to a second aspect of embodiments herein, the object is achieved by a first network node for shortcutting a communication path between a first user equipment and a second user equipment. The first network node, the first and second user equipments are comprised in a communications network. Further, the first network node is configured to communicate upstream and downstream in the communications network.

The first network node comprises a transmitting circuit configured to transmit data. When information about the second user equipment is in a set information, which set of information comprises information about downstream reachable user equipments of the first network node, which first network node has received data destined for the second user equipment from the first user equipment, and when the second user equipment is connected to the first network node, the transmitting circuit is further configured to transmit the data to the second user equipment, whereby the communication path between the first user equipment and the second user equipment is shortcut. Alternatively, when information about the second user equipment is in the set of information, and when a third network node is downstream connected to the first network node and arranged in the communication path between the first network node and the second user equipment, the transmitting circuit is further configured to transmit the data to the third network node, whereby the communication path between the first user equipment and the second user equipment is shortcut.

Since the first network node's set of information may comprise information about the second user equipment, the communication path between the first user equipment and the second user equipment is shortcut at the first network node when the set of nodes comprises information about the second user equipment. This results in an improved performance in the communications network.

An advantage of embodiments herein is that by shortcutting the communication path closer to the user equipments, the amount of data going via network nodes in the communications network that experience capacity shortage due to a large amount of traffic, i.e, via network nodes that are bottlenecks in the communication, is reduced. These network nodes may be aggregation nodes or network nodes near the aggregation nodes, or other network nodes. The reduction in traffic at these bottlenecks is in relation to the standard procedure when the traffic goes all the way back to a node reachable via the backhaul connection and then sent back the same way to the destination. This provides for efficient usage of the underutilized capacity near leaf nodes and improves the overall network performance and end user experience.

A further advantage of embodiments herein is that a shortcut, i.e. a shorter, communication path reduces the amount of processing done in the communications network, which processing is needed to send a message forward towards its destination. Thereby, the consumption of resources, such as energy and time, in the communications network is reduced. The shortcut communication path also provides a shorter delay time in the communication between the first user equipment and the second user equipment.

BRIEF DESCRIPTION OF THE DRAWINGS

Examples of embodiments herein are described in more detail with reference to attached drawings in which.

DETAILED DESCRIPTION

Embodiments herein will be exemplified in the following non-limiting description.

In some embodiments, a device-to-device (D2D) communication between end user devices, e.g. between user equipments, is not routed all the way to the backbone network and then back again. For example, this may be the case when end user devices do not have a direct wireless path, e.g. if high spectrum frequencies are used for the communication and when the devices are in separate rooms. Instead of routing the communication all the way to the backbone network and then back again, the communication path is shortcut already at nodes in the network node tree. In some embodiments, the communication path is shortcut at network nodes with at least a couple of hops to an aggregation node, i.e. to a network node connected to the fibered/wired backbone network.

Each network node will, based on data in its set of information, locally decide whether or not shortcutting of the communication path is possible. This decision is also possibly based on the current use in the local backhaul network. Optimization is possible depending on the current usage, current network load or based on statistics of the usage or network load of particular links.

This shortcutting approach offloads some of the communication from the wireless backhaul bottleneck aggregation nodes or from the wireless backhaul bottleneck nodes near the aggregation nodes so that end users that need to communicate through the backbone network also may benefit from a larger fraction of the totally available capacity provided by the communications network.

Figure 1A:
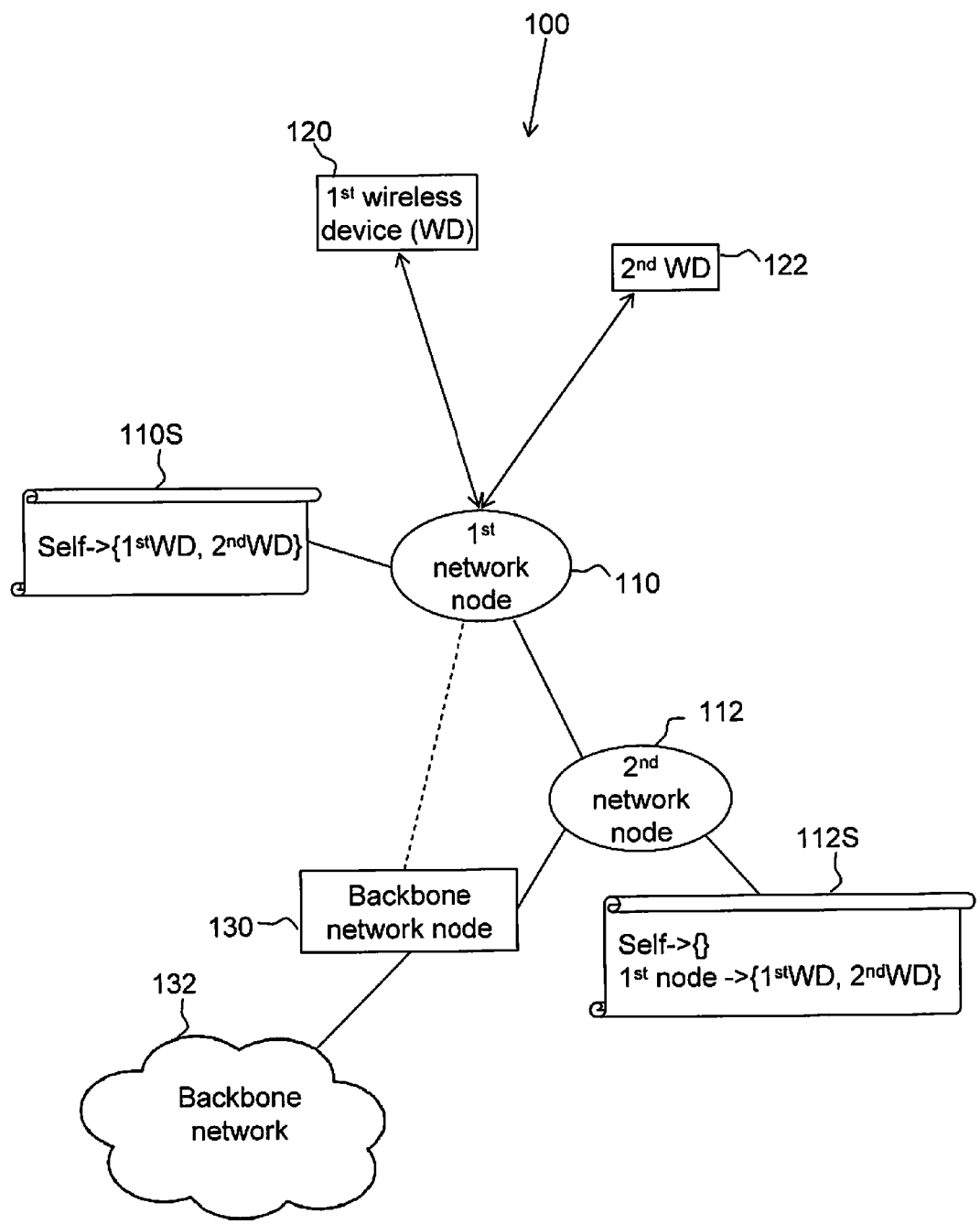
FIGS. 1A-1E schematically illustrate embodiments of a communications network.
Figure 1B:
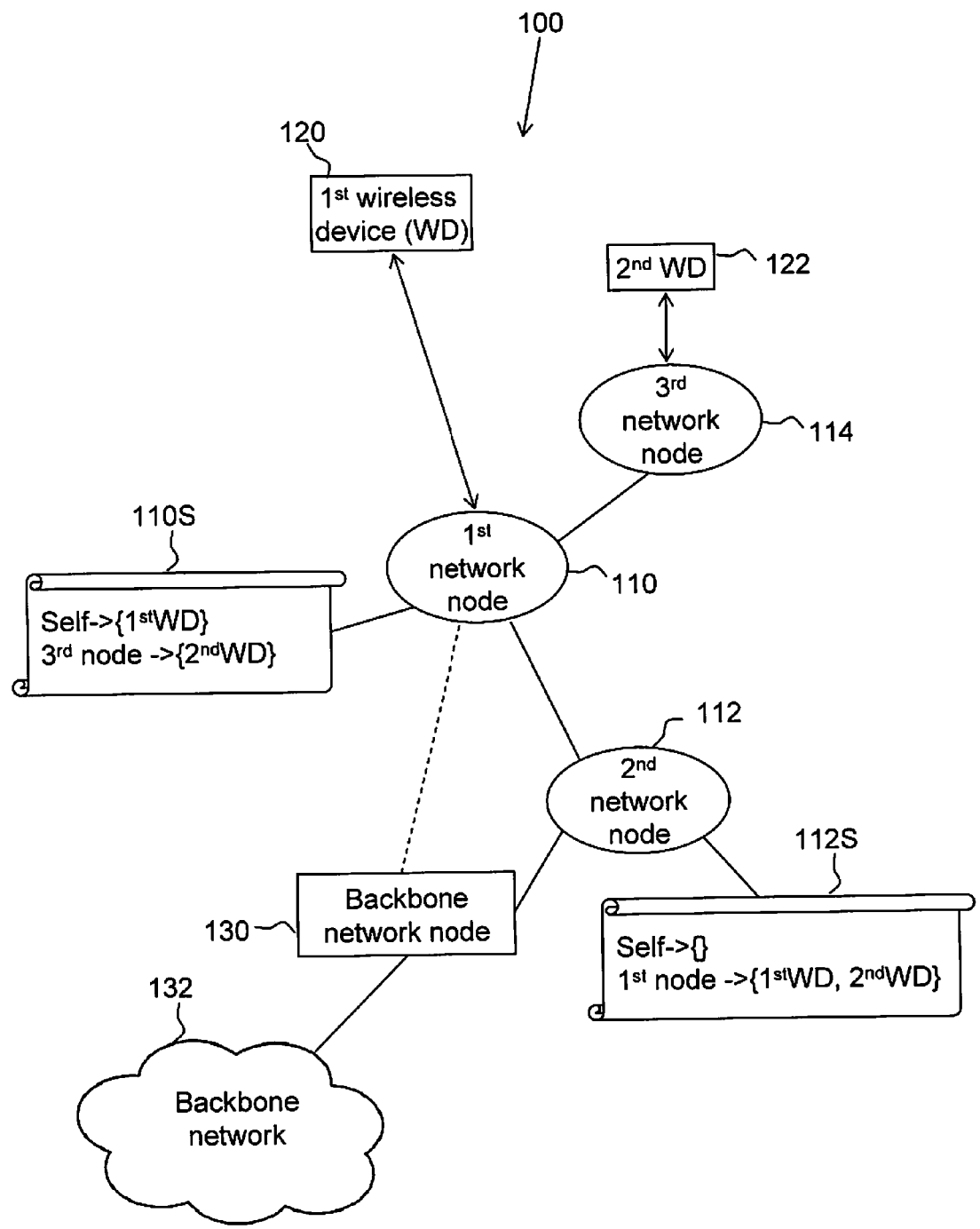
Figure 1C:
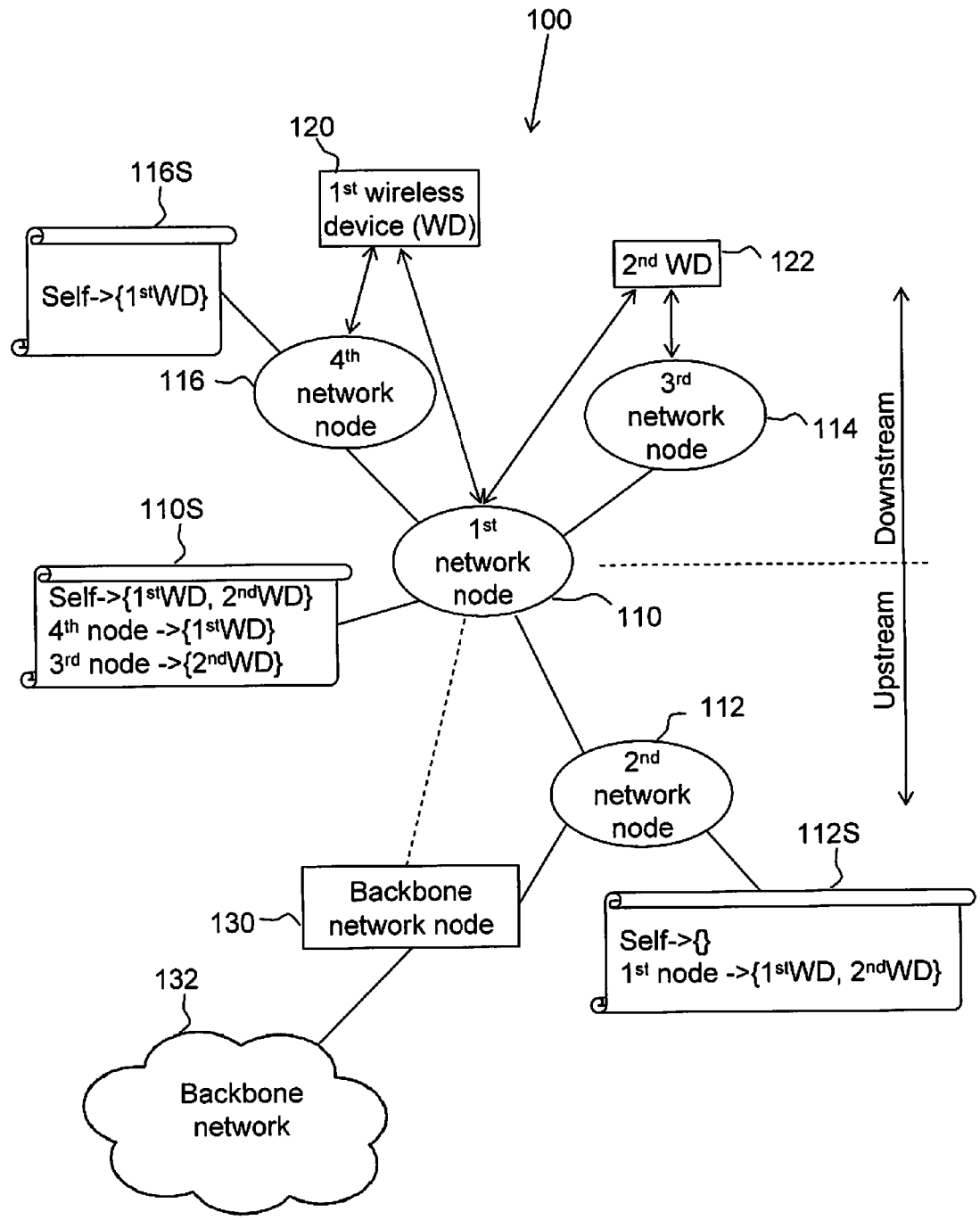
Figure 1D:
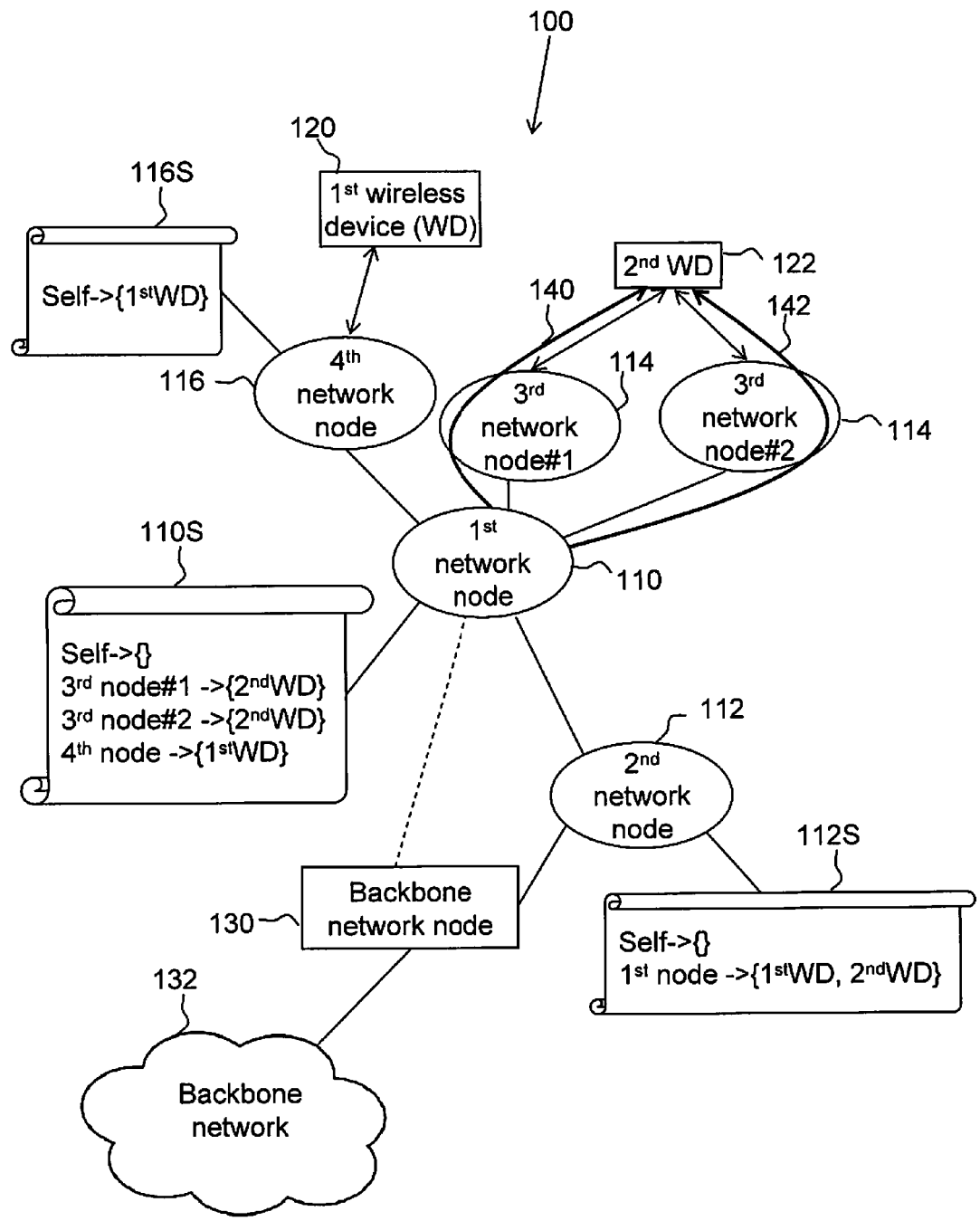
Figure 1E:
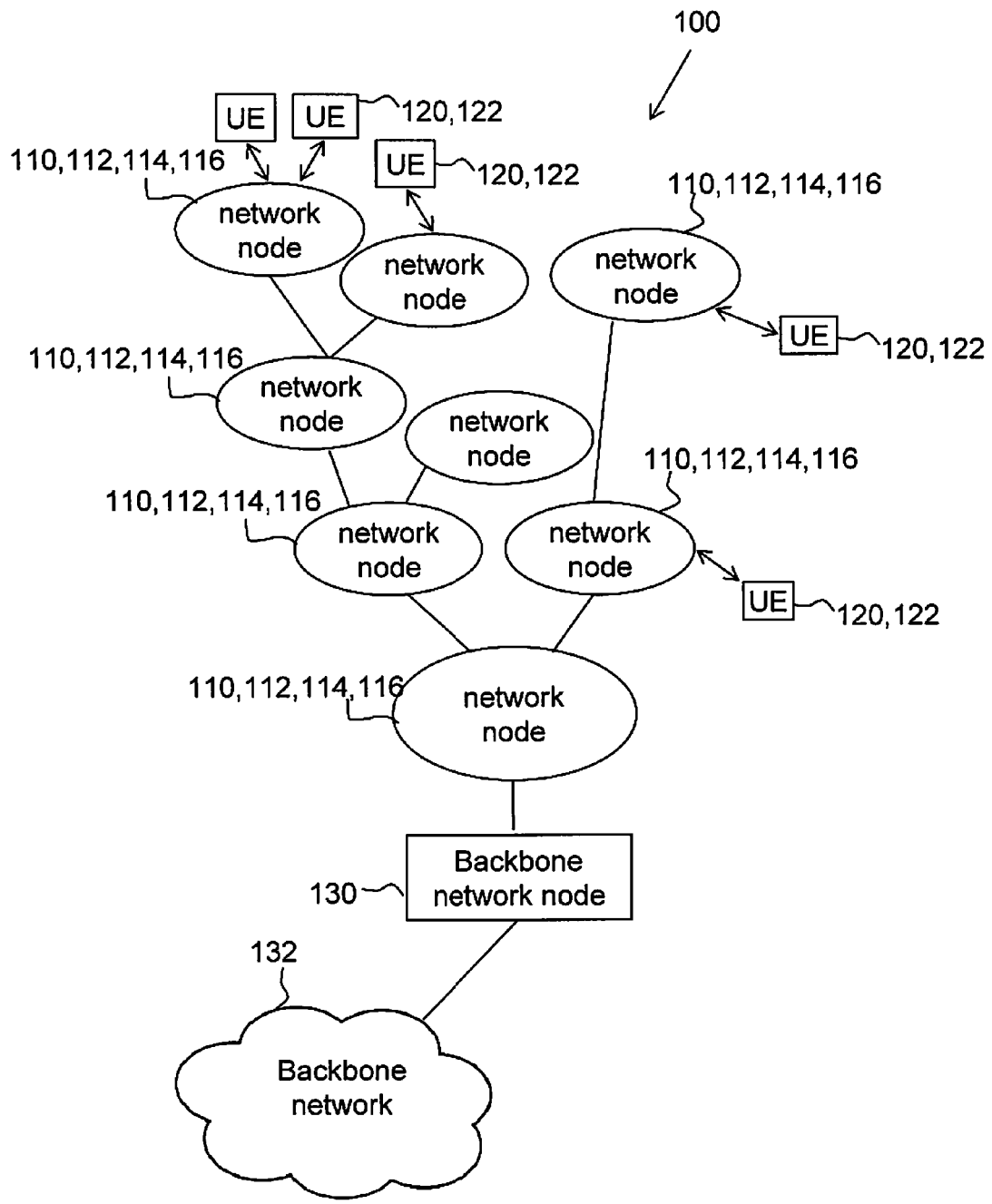

When used herein, the term "upstream" means the direction of communication from a network node towards an aggregation node/backbone network and the term "downstream" means the direction of communication from the network node towards a user equipment being served by the network node or another network node, such as a third network node as schematically illustrated in FIGS. 1B-1D which figures will be described below.

FIGS. 1A-1E schematically illustrate embodiments of a communications network 100. The communications network 100 may be a radio communications network such as a 3GPP communications network or a non-3GPP communications network. It should be understood that the radio communications network 100 may comprise one or more radio communications networks (not shown). Each radio communications network may be configured to support one or more Radio Access Technologies (RATs). Further, the one or more radio communications networks may be configured to support different RATs. Some examples of RATs are GSM, WCDMA, and LTE.

The communications network 100 may further be a mesh network or a Super Dense Network (SDN).

As illustrated in the FIGS. 1A-1E, the communications network 100 comprises a number of network nodes 110,112, 114,116, e.g. a first network node 110, a second network node 112, a third network node 114, and a fourth network node 116. The network nodes 110,112,114,116 may be connected to each other by means of one or more wireless communications links and/or one or more wired communications links. The network nodes 110,112,114,116 may be base stations such as eNBs, eNodeBs, Node Bs or Home Node Bs, Home eNode Bs, radio network controllers, base station controllers, access points, relay nodes which may be fixed or movable, donor nodes serving a relay, GSM/EDGE radio base stations, Multi-Standard Radio (MSR) base stations or any other network units capable to serve a user equipment or another network node comprised in the communications network 100.

Further, the number of network nodes 110,112,114,116 may be arranged in an area, e.g. a corridor or in a shopping mall, such that they provide a high capacity mobile broadband access in the area, e.g. the corridor or the shopping mall.

The communications network 100 further comprises a first user equipment 120 and a second user equipment 122. The first and second user equipment 120,122 may be a wireless communication device such as a mobile terminal or a wireless terminal, a mobile phone, a computer such as e.g. a laptop, a tablet pc such as e.g. an iPad™, a Personal Digital Assistant (PDA), a wireless printer, or any other radio network unit capable to communicate over a radio link in a cellular communications network. The first and second user equipments 120,122 may further be configured for use in both a 3GPP network and in a non-3GPP network. However, the first and second user equipment 120,122 may also be a wired communication device having a wired connection to the communications network 100. In such cases the user equipment may be a laptop or desktop computer connected via an Ethernet connection, or a printer, or any other unit capable of communicating with the communications network 100 over a fixed network connection. Further, it should be understood that the first and second user equipments 120,122 do not have to be used by a user. Instead, the first and second user equipments 120,122 may be any wireless device or wired device configured for use in the communication network 100.

The first and second user equipment 120,122 is connected to one or more of the network nodes 110,112,114,116 by means of one or more wireless communications links and/or one or more wired communications links.

As schematically illustrated in the FIGS. 1A-1E, the network nodes 110,112,114,116 comprises each a set of information 110S,112S,114S,116S. The set of information 110S,112S,114S,116S comprises information about one or more user equipments 120,122 downstream connected to the network node 110,112,114,116. Further, the set 110S,112S, 114S,116S comprises information whether or not the respective network node 110,112,114,116 itself is connected to the user equipment 120,122 and/or whether or not it is connected to the user equipment 120,122 via a downstream connected network node 110,112,114,116.

For example, in FIG. 1A, the first network node 110 has a set of information 110S, which set of information 110S indicates that the first network node 110 itself has a connection with both the first user equipment 120 and the second user equipment 122. This is shown as "self -> $\{1^{st}$ UE, $2^{nd}$ UE$\}$" in the set of information 110S. Further, the second network node 112 has a set of information 112S that indicates that the second network node 112 itself has no connection with the first and second user equipments 120, 122. This is shown as "self -> $\{\ \}$" in the set of information 112S. However, the set of information 112S indicates that the second network node 112 has a connection with the first and second user equipments 120,122 via the first network node 110. This is shown as "$1^{st}$ node -> $\{1^{st}$ UE, $2^{nd}$ UE$\}$" in the set of information 112S.

Further, in FIG. 1B, the first network node 110 has a set of information 110S. The set of information 110S indicates that the first network node 110 itself has a connection with the first user equipment 120, and that the first network node 110 has a connection with the second user equipment 122 via the third network node 114. This is shown as "self -> $\{1^{st}$ UE$\}$" and "$3^{rd}$ node -> $\{2^{nd}$ UE$\}$", respectively, in the set of information 110S. Further, the second network node 112 has a set of information 112S that indicates that the second network node 112 itself has no connection with the first and second user equipments 120,122. This is shown as "self -> $\{\ \}$" in the set of information 112S. However, the set of information 112S indicates that the second network node 112 has a connection with the first user equipment 120 and to the second user equipment 122 via the first network node 110. This is shown as "$1^{st}$ node -> $\{1^{st}$ UE, $2^{nd}$ UE$\}$" in the set of information 112S.

By the expression "network nodes downstream connected to the network node 110,112,114,116", when used herein, is meant network nodes that are connected to the network node 110,112,114,116 and comprised in the communication network 100 between the network node 110,112,114,116 and the user equipment 120,122. This is sometimes also expressed as the network node is downstream reachable from the network node 110,112,114,116. In for example FIG. 1c, the third network node 114 and the fourth network node 116 are downstream connected to the first network node 110.

In correspondence, by the expression "network nodes upstream connected to the network node 110,112,114,116", when used herein, is meant network nodes that are connected to the network node 110,112,114,116 and comprised in the communication network 100 between the network node 110,112,114,116 and the backbone network node 130. This is sometimes also expressed as the network node is upstream reachable from the network node 110,112,114,116. In for example FIG. 1c, the second network node 112 is upstream connected to the first network node 110.

A backbone network node 130 may further be comprised in or connected to the communications network 100. The backbone network node 130 may be a core network node, an Internet node, or any other node that serves as a gateway between the communications network 100 and a backbone network 132. It should be understood that the backbone network 132 is arranged beyond the backbone network node 130. In other words, the backbone network 132 is upstream connected to the backbone network node 130.

Further, the backbone network node 130 may also be referred to as an aggregation node. Furthermore, one or more of the network nodes 110,112,114,116 may be connected to the backbone network node 130 by means of one or more wireless communications links and/or one or more wired communications links. However, in some embodiments, the backbone network node 130 is comprised in the network node 110,112,114,116.

It should be understood that the communications network 100 may comprise or be connected to several backbone network nodes 130 and thereby send user traffic over several paths to the backbone network. Thus, it should be understood that the use of the expression "a backbone network node" herein should be read as "one or more backbone network nodes".

The backbone network 132 is connected to the communications network 100 via one or more backbone network nodes 130. The backbone network 132 may e.g. be a core network, or Internet, but it may also be a network of a fixed line operator. Further, the backbone network 132 may be an operator backbone network serving to connect remote radio network nodes and the network nodes 110,112,114,116 to e.g., the Internet or fixed telephone lines.

Figure 2:
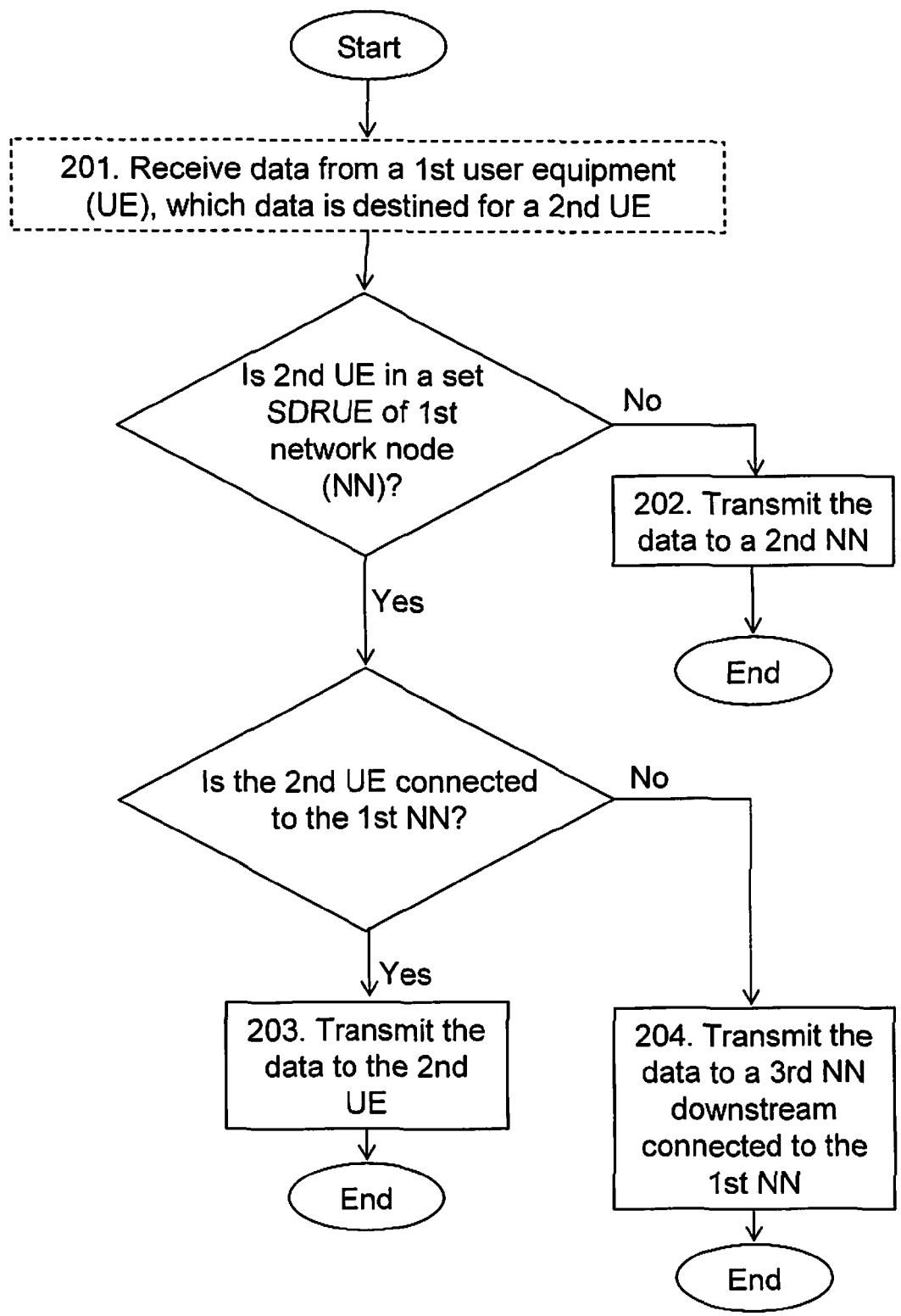
FIG. 2 is a flowchart depicting embodiments of a method in a first network node.

A method in the first network node 110 for shortcutting a communication path between the first user equipment 120 and the second user equipment 122 will now be described with reference to FIG. 2.

As previously mentioned, the first network node 110, the first and second user equipments 120,122 are comprised in a communications network 100. Further, the first network node 110 is configured to communicate upstream and downstream in the communications network 100. The first network node 110, the second network node 112, the third network node 114, and the fourth network node 116 may be mesh network nodes or SDN nodes, and the communications network 100 may be a mesh network or a SDN. However, the communications network 100 may also be another kind of network, wherein each node is not only capable of capturing and disseminating its own data, but also capable of serving as a relay for other nodes, that is, it is capable of propagating data in the network.

By the expression "the first network node 110 is configured to communicate upstream", when used herein, is meant that the first network node 110 is configured to communicate with another network node 112,114,116 connected to the first network node 110 and comprised in the communication network 100 between the first network node 110 and the backbone network node 130. In for example FIG. 1C, the first network node 110 is configured to communicate upstream with the second network node 112.

In correspondence, by the expression "the first network node 110 is configured to communicate downstream", when used herein, is meant that the first network node 110 is configured to communicate with another network node 112,114,116 connected to the first network node 110 and comprised in the communication network 100 between the first network node 110 and the user equipment 120,122. It should also be understood that the network node 110,112, 114,116 may be configured to communicate downstream with a user equipment 120,122 connected to the network node 110,112,114,116. In for example FIG. 1C, the first network node 110 is configured to communicate downstream with the third network node 114 and the fourth network node 116. Further, the first network node 110 is configured to communicate downstream with the first user equipment 120 and with the second user equipment 122.

The method comprises the following actions, which actions do not have to be performed in the order stated below, but may be taken in any suitable order. Further, actions may be combined. Optional actions are indicated by dashed boxes.

Action 201

In some embodiments, the first network node 112 receives data from the first user equipment 120. The data is destined to the second user equipment 122.

By the expression "data" when used herein is meant a message such as a text message, a video message, and/or an audio message; an image; a data packet; or any other kind of item transmitted from the first user equipment 120 and destined to the second user equipment 122.

Further, in some embodiments, in order to determine a destination of the data, the first network node 112 reads a destination address, e.g. an IP address, of the received data. Thereby, the second user equipment 122 to which the data is destined may be determined or identified.

The data may be received directly from the first user equipment 120, which first user equipment 120 is downstream connected to the first network node 110, cf. FIG. 1A. The data may also be received from a fourth network node 116, which fourth network node 116 is downstream connected to the first network node 110 and arranged between the first network node 110 and the first user equipment 120 as schematically illustrated in FIGS. 1C and 1D.

Action 202

In some embodiments, if the first network node 110 is not connected to the second user equipment 122, neither directly or indirectly via a downstream connected network node, the second user equipment 122 is not comprised in the first network node's set of information 110S. In such case, the received data is propagated from the first network node 110 to an upstream connected network node, or to an upstream connected backbone network node 130 if no upstream connected network node exists. In other words, when information about the second user equipment 122 is not comprised in the set 110S of the first network node 110, which first network node 110 has received data destined for the second user equipment 122 from the first user equipment 120, the first network node 110 transmits the data to a second network node 112 that is upstream connected to the first network node 110 and comprised in the communications network 100 or to the backbone network node 130. Confer for example FIGS. 5A, 5B and 6 which will be described in more detail below.

However, it should be understood that in case no upstream connected network node exists and in case the received data is propagated from the first network node 110 to the upstream connected backbone network node 130, no shortcutting of the communication path will be obtained. Thereby, the received data will be propagated upstream all the way to the backbone network before it will from there be propagated towards the second user equipment 122. This may be the case when the second user equipment 122 is connected at some other location in e.g. another communications network (not shown), which communications network is different from the communications network 100 that comprises the first user equipment 120. Thus, in this case, the set of information 110S,112S,114S,116S of the respective network nodes 110,112,114,116 of the communications network 100 does not contain the second user equipment 122, and therefore the received data will be propagated upstream all the way to the backbone network.

In some embodiments, the second network node 112 that is upstream connected to the first network node 110 is a network node that is connected to the first network node 110, and arranged between the first network node 110 and a backbone network node 130.

In some embodiments, the set of information 110S comprises information about one or more third and fourth network nodes 114,116 that are downstream connected to the first network node 110, and arranged between the first network node 110 and the first and second user equipments 120,122; and about one or more first and second user equipments 120,122 that are downstream connected to the first network node 110 either directly or indirectly via the one or more third and fourth network nodes 114,116.

Action 203

When information about the second user equipment 122 is in the set of information 110S, and when the second user equipment 122 is directly connected to the first network node 110, the first network node 110 transmits the data to the second user equipment 122, cf. e.g. FIG. 1A.

Action 204

As an alternative to action 203, when information about the second user equipment 122 is in the set of information 110S, and when a third network node 114 is downstream connected to the first network node 110 and arranged in the communication path between the first network node 110 and the second user equipment 122, the first network node 110 transmits the data to the third network node 114, cf. e.g. FIG. 1B.

In some embodiments, when information about the second user equipment 122 is comprised twice or more times in the set of information 110S, cf. FIGS. 1C and 1D, alternative communications paths exist as schematically illustrated in FIG. 1D. In such embodiments, when two or more third network nodes 114 (illustrated as $3^{rd}$ network node#1 and $3^{rd}$ network node#2 in FIG. 1D) are downstream connected to the first network node 110 and arranged between the first network node 110 and the second user equipment 122, the first network node 110 transmits the data via the third network node 114 of the two or more third network nodes 114 that has the best communication path between the first network node 110 and the second user equipment 122. If for example the $3^{rd}$ network node#1 in FIG. 10 has a first communication path 140 between the first network node 110 and the second user equipment 122 that is better than a second communication path 142 between the first network node 110 and the second user equipment 122 via another third network node 114, i.e. the $3^{rd}$ network node#2 in FIG. 1D, the first network node 110 transmits the data via the first communication path 140.

The first communication path 140 may be better than the second communication path 142 when the signal quality of the first communication path 140 is better than the signal quality of the second communication path 142. Further, the first communication path 140 may be better than the second communication path 142 when the load in the first communication path 140 is lesser than the load in the second communication path 142. However, as understood by those skilled in the art, other means for determining which communication path is the best or the preferred exist.

In some embodiments, the first network node 110 determines or decides which communication path of a plurality of communication paths is the best communication path.

Figure 3:
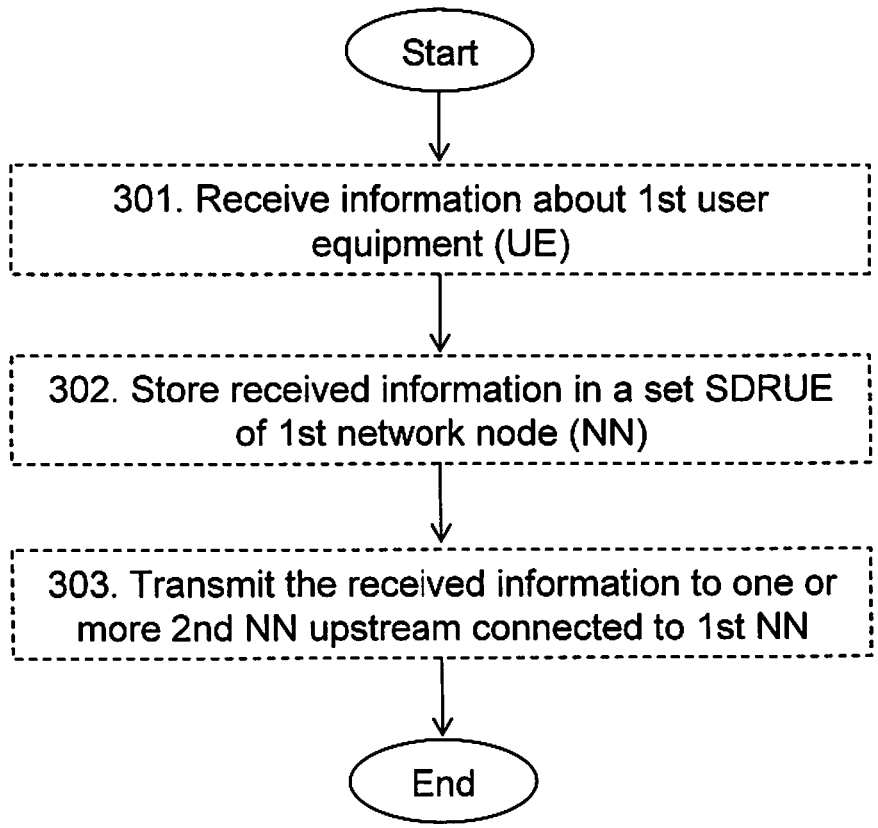
FIG. 3 is a flowchart depicting embodiments of a method in a first network node.

Some embodiments of the method in the first network node 110 for shortcutting a communication path between the first user equipment 120 and the second user equipment 122 as described above with reference to FIG. 2, may also comprise a method of creating the set(-s) 110S,112S,114S, 116S. This method will now be described with reference to FIG. 3.

As previously mentioned, the first network node 110, the first and second user equipments 120,122 are comprised in the communications network 100. Further, the first network node 110 is configured to communicate upstream and downstream in the communications network 100. The network node 110,112,114,116 may be a mesh network node or a Super Dense Network, SDN, node, and the communications network may be a mesh network or a SDN.

The method comprises the following actions, which actions do not have to be performed in the order stated below, but may be taken in any suitable order. Further, actions may be combined. Optional actions are indicated by dashed boxes.

Action 301

The first network node 110 receives information about the first user equipment 120. The information may be or comprise information identifying the first user equipment 120, but it may also be information about a user of the first user equipment 120 and the shortcutting may be based on the user information, e.g. the identity of the user, instead of the identity of the first user equipment 120.

In some embodiments, the first network node 110 receives the information directly from the first user equipment 120, cf. e.g. FIGS. 1A and 1B. However, the first network node 110 may receive the information from a fourth network node 116 that is downstream connected to the first network node 110 and arranged between the first network node 110 and the first user equipment 120, cf. e.g. FIGS. 1C and 1D.

Action 302

The first network node 110 stores the received information in the set of information 110S of the first network node 110.

In some embodiments, when the information is received from the first user equipment 120, the first network node 110 stores that it has a direct connection with the first user equipment 120, cf. "self->{$1^{st}$ UE}" in the set of information 110S shown in FIGS. 1A and 1B.

In some other embodiments, when the information is received from the fourth network node 116, the first network node 110 stores that it has an indirect connection with the first user equipment 120 via the fourth network node 116, cf. "$4^{th}$ node->{$1^{st}$ UE}" in the set of information 110S shown in FIGS. 1C and 1D.

Action 303

The first network node 110 transmits the received information about the first user equipment 120 to one or more second network nodes 112 upstream connected to the first network node 110 and arranged between the first network node 110 and the backbone network node 130.

Figure 4:
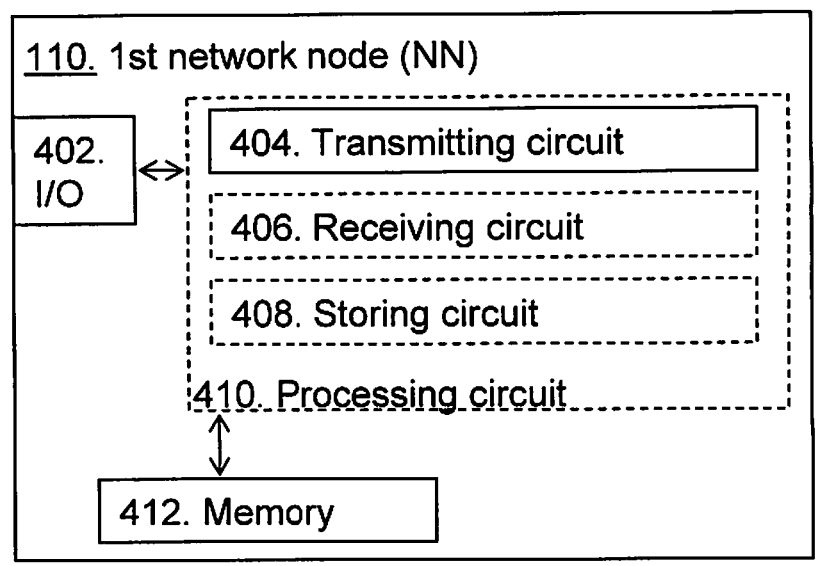
FIG. 4 is a schematic block diagram illustrating embodiments of a first network node.

To perform the method actions in the first network node 112 described above in relation to FIGS. 2 and 3, embodiments of the first network node 112 comprises the following arrangement depicted in FIG. 4.

As previously mentioned, the first network node 110, the first and second user equipments 120,122 are comprised in a communications network 100. Further, the first network node 110 is configured to communicate upstream and downstream in the communications network 100. The network node 110,112,114,116 may be a mesh network node or a SDN node, and the communications network 100 may be a mesh network or a SDN.

The first network node 110 comprises an input and output interface 402 configured to function as an interface for communication in the communications network 100. The communication may for example be communication with the network node 110,112,114,116 and/or with the user equipment 120,122 and/or the backbone network node 130. In some embodiments, the input and output interface 402 comprises an antenna and/or an Ethernet connection unit.

The first network node 110 comprises a transmitting circuit 404 configured to transmit data to a second network node 112, when information about a second user equipment 122 is not comprised in a set of information 110S of the first network node 110. The second network node 112 is upstream connected to the first network node 110 and comprised in the communications network 100. Further, the first network node 110 has received the data destined for the second user equipment 122 from the first user equipment 120.

When information about the second user equipment 122 is in the set of information 110S, and when the second user equipment 122 is connected to the first network node 110, the transmitting circuit 404 is further configured to transmit the data to the second user equipment 122. Thereby the communication path between the first user equipment 120 and the second user equipment 122 is shortcut. Alternatively, when information about the second user equipment 122 is in the set of information 110S, and when a third network node 114 is downstream connected to the first network node 110 and arranged in the communication path between the first network node 110 and the second user equipment 122, the transmitting circuit 404 is further configured to transmit the data to the third network node 114. Thereby the communication path between the first user equipment 120 and the second user equipment 122 is shortcut.

In some embodiments, the set of information 110S comprises information about one or more third and fourth network nodes 114,116 that are downstream connected to the first network node 110, and arranged in the communication path between the first network node 110 and the first and second user equipments 120,122. Alternatively or in addition, the set of information 110S may comprise information about one or more first and second user equipments 120,122 that are downstream connected to the first network node 110 either directly or indirectly via the one or more third and fourth network nodes 114,116.

In some embodiments, when information about the second user equipment 122 is comprised twice or more times in the set of information 110S, and when two or more third network nodes 114 are downstream connected to the first network node 110 and arranged between the first network node 110 and the second user equipment 122, alternative communication paths exist. In such embodiments, the transmitting circuit 404 is further configured to transmit the data to the third network node 114 via which third network node 114 a first communication path 140 between the first network node 110 and the second user equipment 122 is better than a second communication path 142 between the first network node 110 and the second user equipment 122 possibly via another third network node 114.

In some embodiments, wherein the first network node 110 has received information about the first user equipment 120, as described in relation to Actions 301-303 above and as will be described below, the transmitting circuit 404 is further configured to transmit the received information about the first user equipment 120 to one or more network nodes 112 upstream connected to the first network node 110 and arranged between the first network node 110 and a backbone network node 130.

In some embodiments, the first network node further comprises a receiving circuit 406 configured to receive data from the first user equipment 120.

As previously mentioned, by the expression "data" when used herein is meant a message such as a text message, a video message, and/or an audio message; an image; a data packet; or any other kind of item transmitted from the first user equipment 120 and destined to the second user equipment 122.

Further, the data is destined to the second user equipment 122. In some embodiments, the first network node 112, e.g. by means of the receiving circuit 406, reads a destination address, e.g. an IP address, of the received data in order to determine the second user equipment 122 to which the data is destined.

The receiving circuit 406 may be configured to receive the data directly from the first user equipment 120, which first user equipment 120 is downstream connected to the first network node 110 or to receive the data from a fourth network node 116, which fourth network node 116 is downstream connected to the first network node 110 and arranged in the communication path between the first network node 110 and the first user equipment 120.

In some embodiments, the receiving circuit 406 is further configured to receive information about the first user equipment 120. As previously mentioned, the information may be or comprise information identifying the first user equipment 120, but it may also be information about a user of the first user equipment 120 and the shortcutting may be based on the user information, e.g. the identity of the user, instead of the identity of the first user equipment 120.

Further, the receiving circuit 406 may be configured to receive the information directly from the first user equipment 120, or from a fourth network node 116 that is downstream connected to the first network node 110 and arranged between the first network node 110 and the first user equipment 120.

The first network node 110 may further comprise a storing circuit 408 configured to store the received information in the set of information 110S.

In some embodiments, the storing circuit 408 is configured to store that the first network node 110 has a direct connection with the first user equipment 120 when the information is received from the first user equipment 120, cf. FIGS. 1A and 1B. Alternatively or in addition, the storing circuit 408 may be configured to store that the first network node 110 has an indirect connection with the first user equipment 120 via the fourth network node 116 when the information is received from the fourth network node 116, cf. FIGS. 1C and 1D.

Embodiments herein for shortcutting a communication path between the first user equipment 120 and the second user equipment 122 may be implemented through one or more processors, such as a processing circuit 410 in the arrangement depicted in FIG. 4, together with computer program code for performing the functions and/or method actions of embodiments herein.

It should be understood that one or more of the circuits comprised in the first network node 110 described above may be integrated with each other to form an integrated circuit.

The computer program code mentioned above may also be provided as a computer program product, for instance in the form of a data carrier carrying computer program code for performing the embodiments herein when being loaded into the first network node 110. One such carrier may be in the form of a CD or DVD. It is however feasible with other data carriers such as a memory stick, memory card or hard drive. The computer program code may furthermore be provided as pure program code on a server for download to the first network node 110. The computer program code may furthermore be provided in the form of a data file or files on, or available through, a server for download. The file or files may be executable files for direct or indirect download to and execution on the first network node 110, or may be for intermediate download and compilation to make them executable before download to and for execution on the first network node 110. The server may be accessible over a computer network, such as the Internet, and may e.g. be a web or ftp server.

Those skilled in the art will also appreciate that the input output interface 402, the transmitting circuit 404, the receiving circuit 406, and the storing circuit 408 may refer to a combination of analog and digital circuits, and/or one or more processors configured with software and/or firmware (e.g., stored in memory) that, when executed by the one or more processors such as the processing circuit 410, perform as described above. One or more of these processors, as well as the other digital hardware, may be included in a single Application-Specific Integrated Circuit (ASIC), or several processors and various digital hardware may be distributed among several separate components, whether individually packaged or assembled into a system-on-a-chip (SoC).

The first network node 110 may further comprise a memory 412. The memory may comprise one or more memory units and may be used to store for example data such as information relating to the user equipments and network nodes, e.g. information relating to or comprised in the first network node's set of nodes; thresholds; predefined or pre-set information, etc.

It should be understood that even if the description refers to a first network node 110, to a second network node 112, to a third network node 114 and to a fourth network node 116, the second network node 112, the third network node 114 and the fourth network node 116 may perform the same actions and comprise the same arrangement as those described above with reference to the first network node 110.

Some exemplifying embodiments of propagation of information in the communications network 100 and of shortcutting of communications paths will now be described with reference to FIGS. 5A, 5B, and 6-9. Even if reference is made to SDN nodes in the FIGS. 5A, 5B, and 6-9 and in the accompanying description, it should be understood that the communication network 100 does not have to be a SDN, and thus that the nodes may be of another suitable kind such as mesh nodes comprised in a mesh network.

Figure 5A:
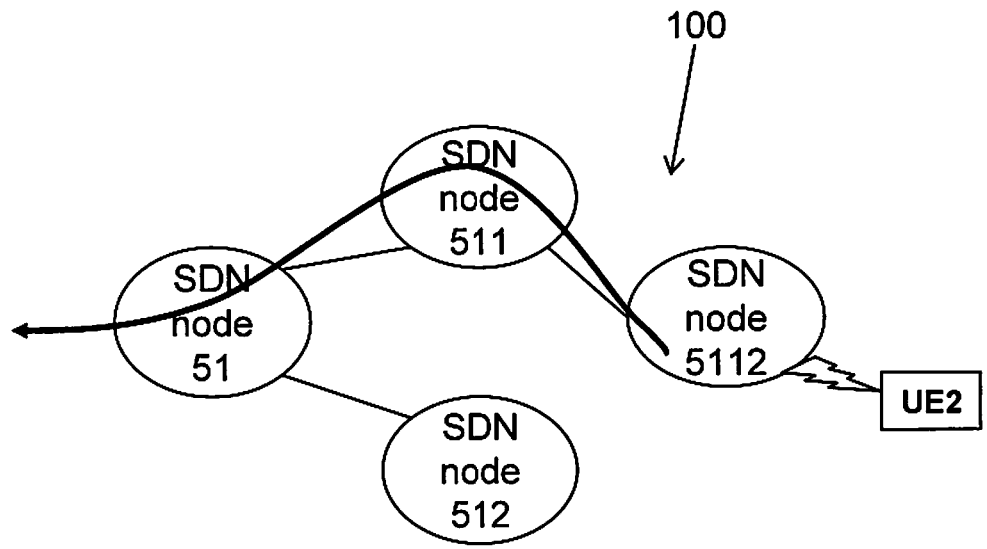
FIGS. 5A and 5B schematically illustrate propagation of information relating to a user equipment in embodiments of a communications network.
Figure 5B:
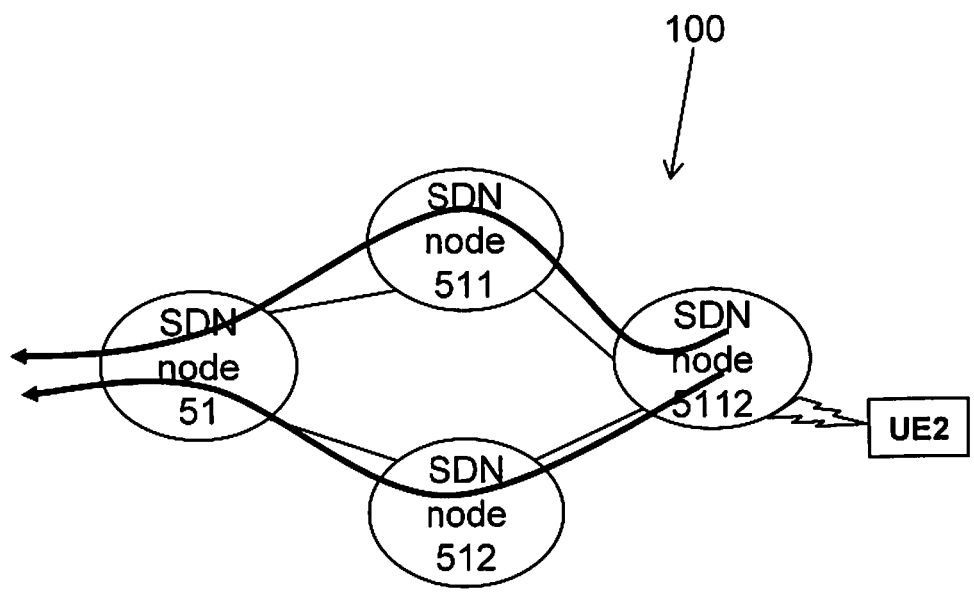

FIGS. 5A and 5B schematically illustrate propagation of information relating to a user equipment 120,122, herein denoted UE2, comprised in embodiments of the communications network 100. It is schematically illustrated how information about the user equipment UE2 is received in a SDN node 5112, stored in the set of information (not shown) and transmitted further to a SDN node upstream connected to the SDN node 5112. The SDN node 5112 may receive the information when the user equipment UE2 connects to the SDN node 5112. However, the SDN node 5112 may receive the information when the user equipment UE2 disconnects from the SDN node 5112. In this latter case the information stored and propagated in the communication network 100 should be that the user equipment UE2 no longer is available for communication via the SDN node 5112. In such case the user equipment UE2 is removed from the respective SDN node's set of information.

In FIG. 5A, the SDN node 5112 stores the information in its set of information (not shown) and transmits the information to a SDN node 511 that is upstream connected to the SDN node 5112. Further, the process will be repeated in the SDN node 511 which receives the information, stores it in its set of information (not shown), and transmits it to the SDN node 51 that is upstream connected to the SDN node 511.

In FIG. 5B, the SDN node 5112 stores the information in its set of information (not shown), and transmits the information to both the SDN node 511 and the SDN node 512 which both are upstream connected to the SDN node 5112. Further, the process will be repeated in both the SDN node 511 and the SDN node 512, which SDN nodes 511,512 receive the information, store it in their respective set of information (not shown), and transmit it to the SDN node 51 that is upstream connected to each of them.

Figure 6:
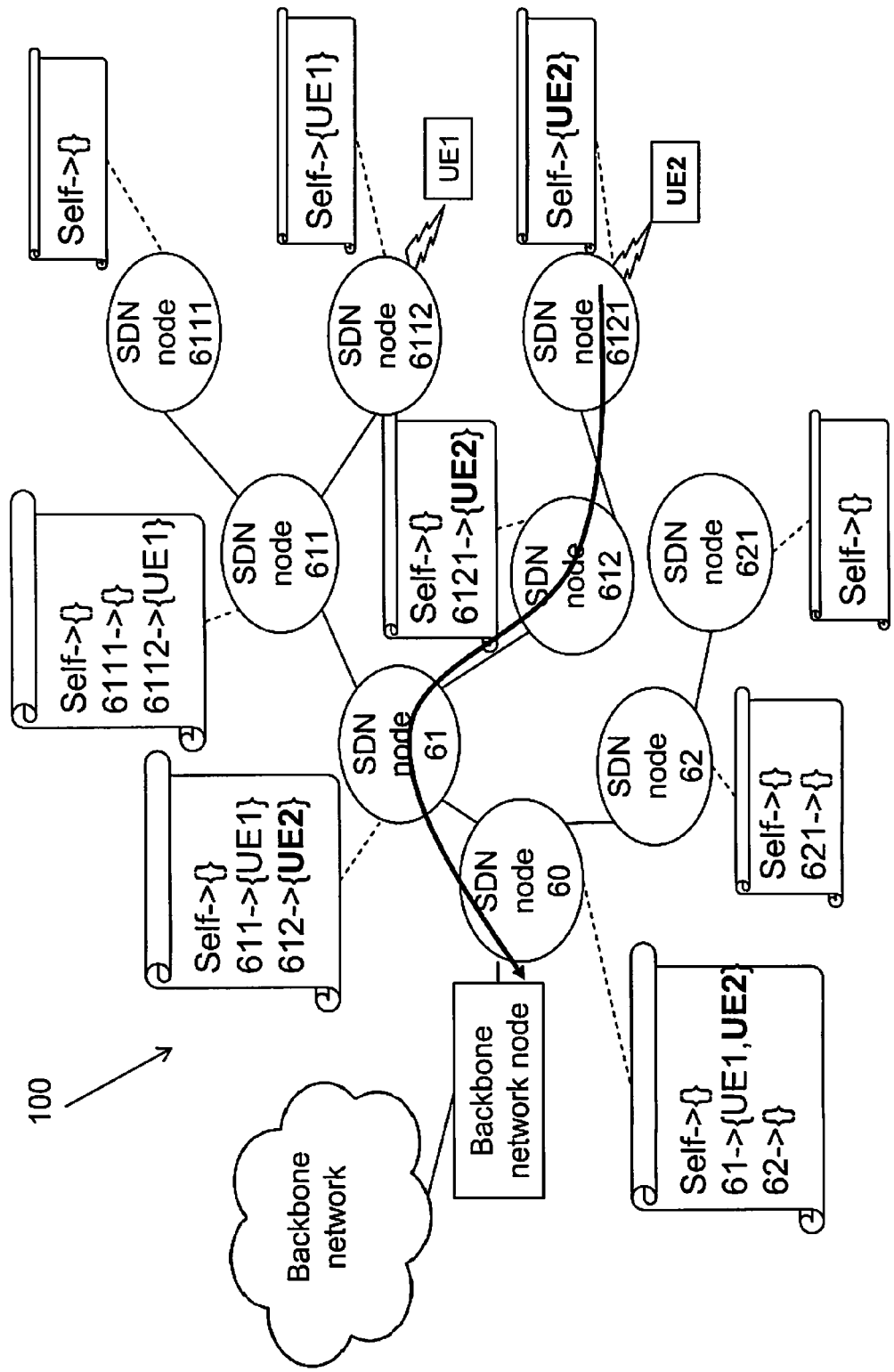
FIG. 6 schematically illustrates propagation of information relating to a user equipment in embodiments of a communications network.

FIG. 6 schematically illustrates another example of how information about the user equipment 120,122, herein denoted UE2, is propagated in the communication network 100. In this example, the SDN node 6121 receives information from the user equipment UE2 when the user equipment UE2 connects to or disconnects from the SDN node 6121.

Assume that the user equipment UE2 connects to the SDN node 6121. In its set of information, the SDN node 6121 stores that it itself is connected to the user equipment UE2, indicated as "self->{UE2}" in its set of information. The information about the user equipment UE2 is transmitted from the SDN node 6121 to the SDN node 612 that is upstream connected to the SDN node 6121. The SDN node 612 stores in its set of information that it is connected to the user equipment UE2 via the SDN node 6121, indicated as "6121->{UE2}" in its set of information. Further, since the SDN node 612 is not directly connected to the user equipment UE2 this is indicated as "self->{ }" in its set of information. The information about the user equipment UE2 is then transmitted from the SDN node 612 to the SDN node 61 that is upstream connected to the SDN node 612. The SDN node 61 stores the information in its set of information as "612->{UE2}" indicating that the SDN node 61 is connected to the user equipment UE2 via SDN node 612. From the set it is also shown that the SDN node 61 is connected to the user equipment UE1 via the SDN node 611. The SDN node 61 then transmits the information to the SDN node 60, which nodes stores in its set of information that it is connected to the user equipment UE2 via the SDN node 61.

In some embodiments, the SDN node 60 is connected to the backbone network node by means of a wired or wireless connection. However, in some other embodiments, the SDN node 60 comprises the backbone network node.

As previously mentioned in relation to FIGS. 5A and 5B, when the user equipment UE2 disconnects from the communication network 100, e.g. from SDN node 6121, the information about the user equipment UE2 may also be propagated upstream in the communication network 100 in order to remove the user equipment UE2 from the set of information of the SDN node 6121, the SDN node 612, the SDN node 61, and of the SDN node 60, respectively.

Figure 7:
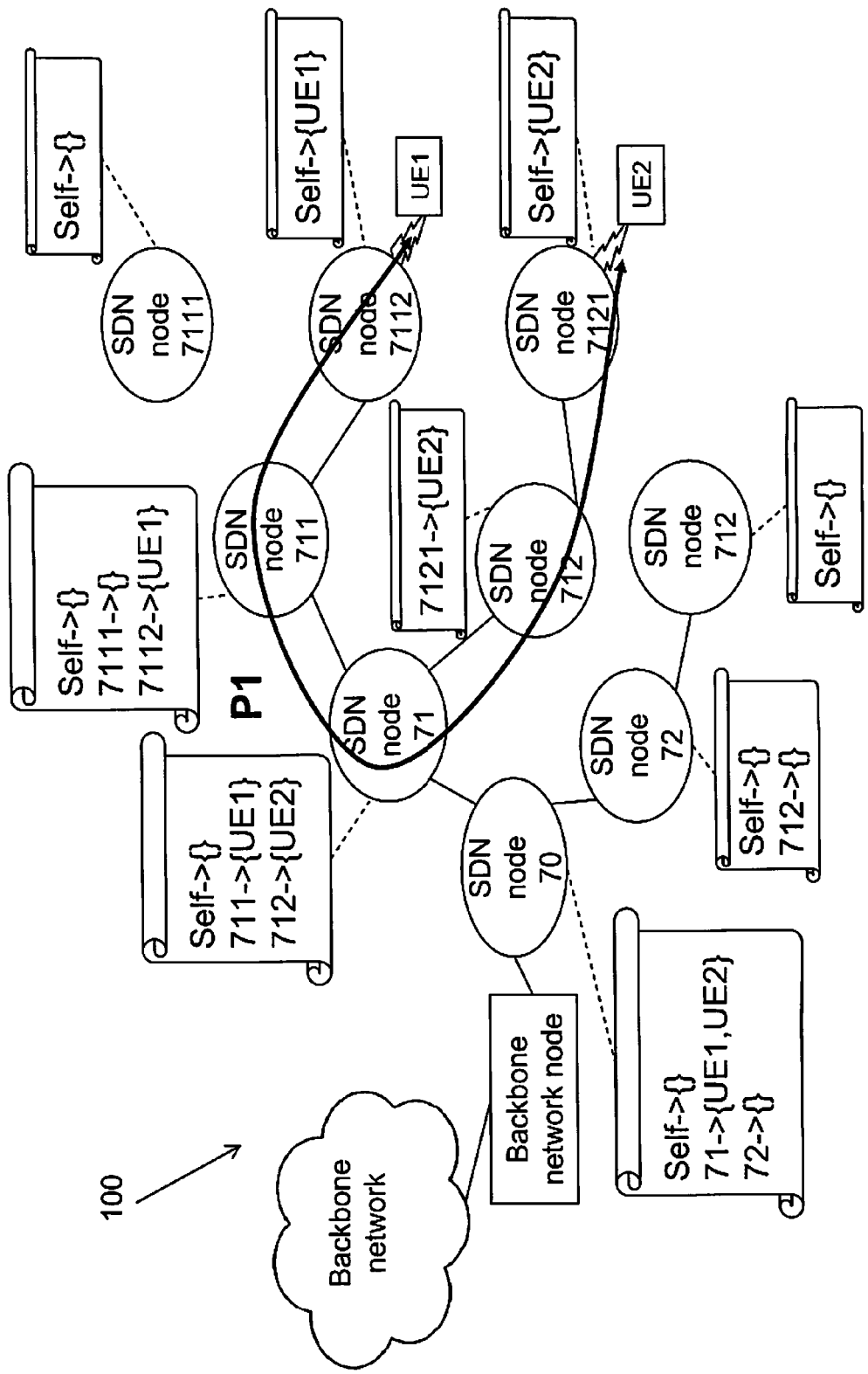
FIG. 7 schematically illustrates shortcutting of a communication path between two user equipments comprised in embodiments of a communications network.

FIG. 7 schematically illustrates shortcutting of a communication path between a first user equipment 120 and a second user equipment 122, herein denoted UE1 and UE2, comprised in embodiments of the communications network 100. As schematically illustrated, the communication path P1 is shortcut at the SDN node 71. The reason for this is that, when going upstream from each of the user equipments UE1,UE2 towards the backbone network node, the SDN node 71 is the first node that has information about both user equipments UE1, UE2 in its set of information. In FIG. 7 it is shown that the SDN node 71 is connected to the user equipment UE1 via the SDN node 711 (indicated as "711->{UE1}" in its set of information), and that the SDN node 71 is connected to the user equipment UE2 via the SDN node 712 (indicated as "712->{UE2}" in its set of information).

In some embodiments, the SDN node 70 is connected to the backbone network node by means of a wired or wireless connection. However, in some other embodiments, the SDN node 70 comprises the backbone network node.

Figure 8:
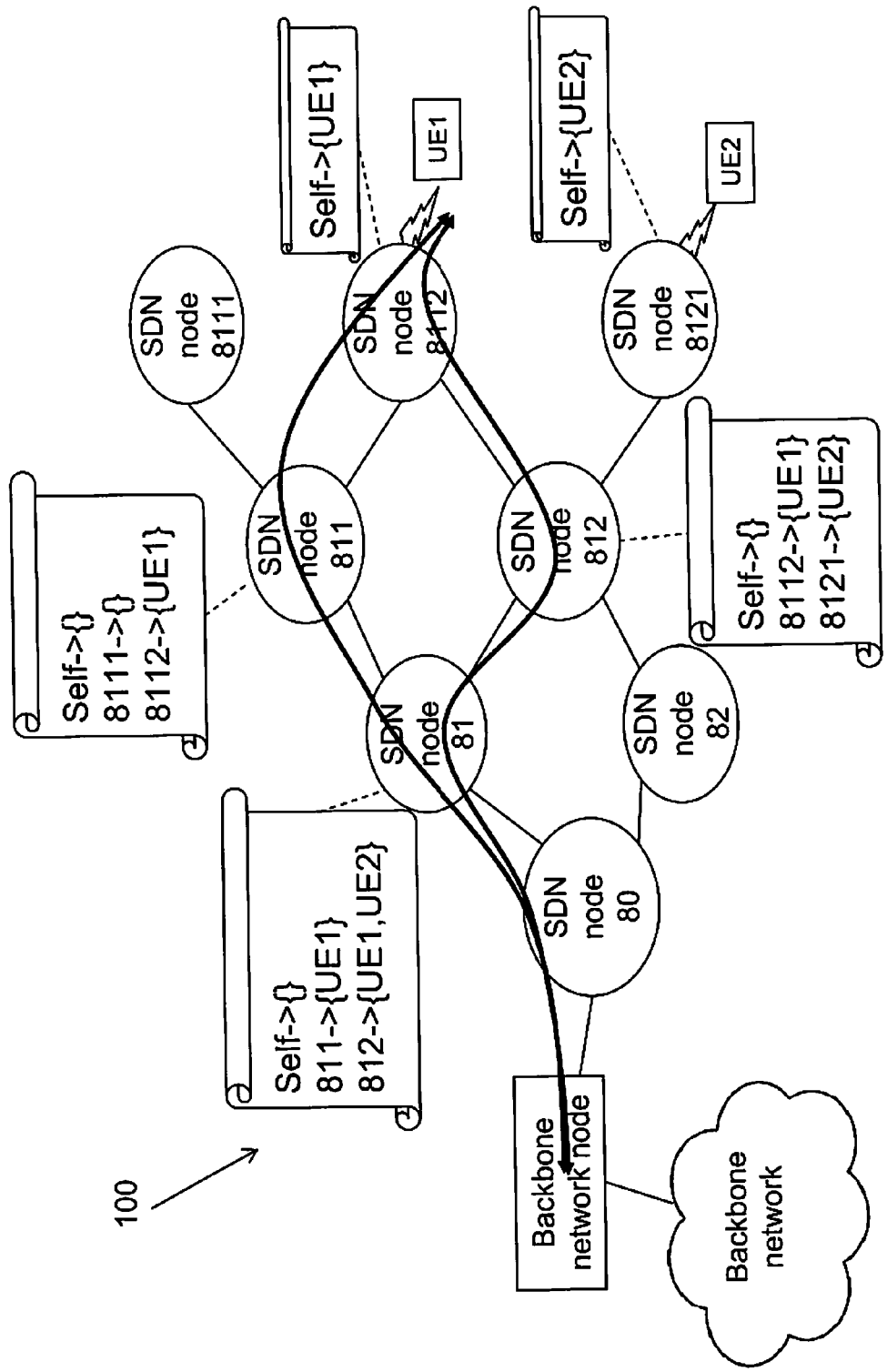
FIG. 8 schematically illustrates propagation of information relating to a user equipment in embodiments of a communications network.

FIG. 8 schematically illustrates propagation of information relating to a user equipment 120,122, herein denoted UE1, in embodiments of the communications network 100. As schematically illustrated, information from the user equipment UE1 is propagated upstream in the communications network 100 to the SDN node 80. As also illustrated, two alternative routes exist between the user equipment UE1 and the SDN node 80. A first route passes the SDN node 8112, the SDN node 811, and the SDN node 81, and a second route passes SDN node 8112, the SDN node 812, and the SDN node 81. Further, the user equipment UE1 is comprised twice in the set of the SDN node 81. As indicated by "811->{UE1}" in its set of information, the SDN node 81 is connected to the user equipment UE1 via the SDN node 811, and as indicated by "812->{UE1}" in its set of information, the SDN node 81 is also connected to the user equipment UE1 via the SDN node 812. Thus, two alternative paths also exist between the SDN node 81 and the user equipment UE1. Depending on for example the load in the respective route, the route with the lowest load may be selected for communication in order to e.g. off-load the other too loaded route.

In some embodiments, the SDN node 80 is connected to the backbone network node by means of a wired or wireless connection. However, in some other embodiments, the SDN node 80 comprises the backbone network node.

Figure 9:
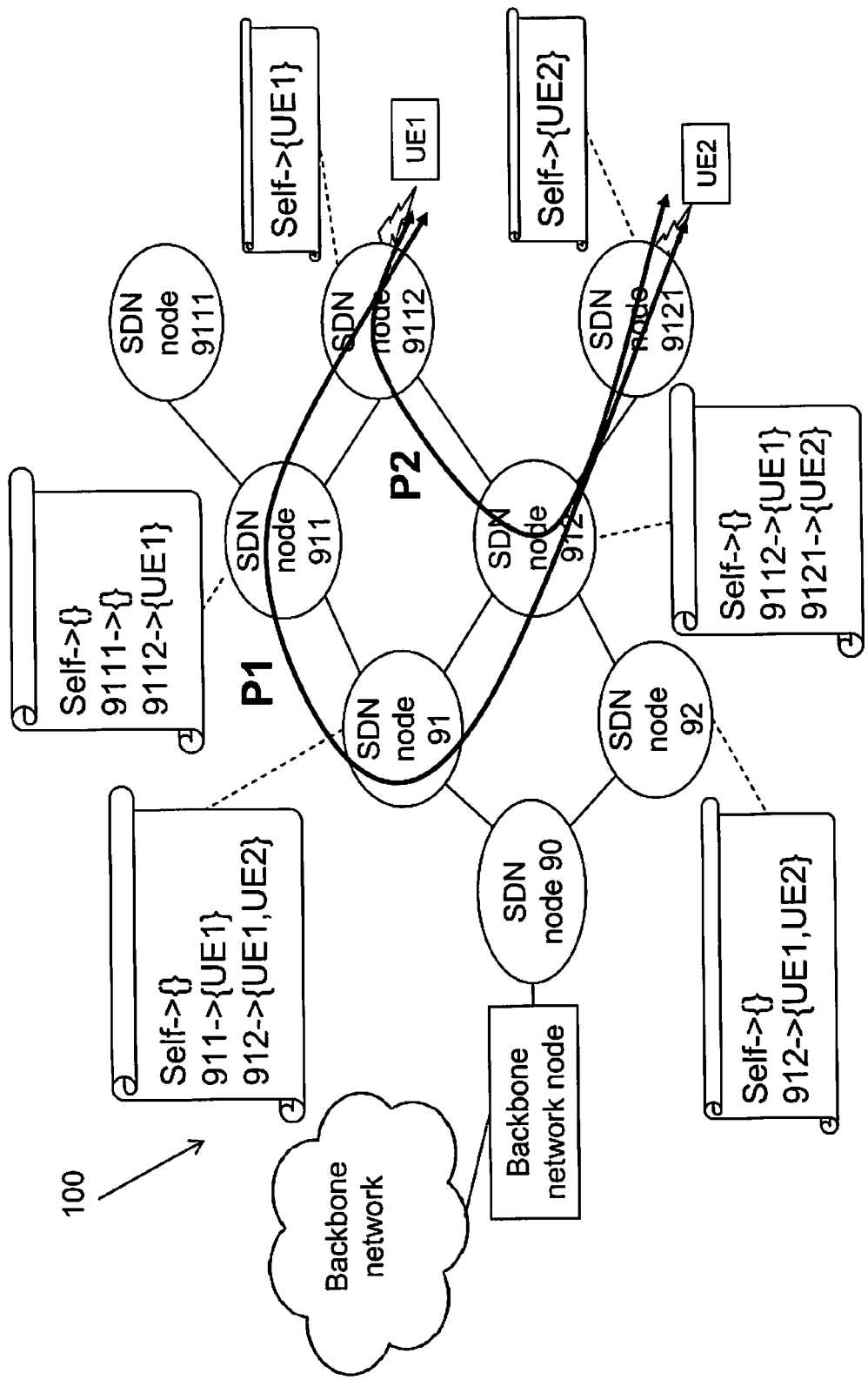
FIG. 9 schematically illustrates alternative shortcuts of a communication path between two user equipments comprised in embodiments of a communications network.

FIG. 9 schematically illustrates alternative ways to short-cut a communication path between two user equipments UE1, UE2 comprised in embodiments of the communications network 100. As schematically illustrated in FIG. 9, two alternative communications paths P1 and P2 exist between the two user equipments UE1 and UE2. The first communication path P1 passes SDN node 9112, SDN node 911, SDN node 91, SDN node 912, and SDN node 9121, and the second communication path P2 passes SDN node 9112, SDN node 912, and SDN node 9121. Whether or not the communication between the two devices UE1 and UE2 should follow the first communication path P1 or the second communication path P2 may be dependent on load balancing schemes in the communication network 100 and on channel capacity. However, in some embodiments, the decision of selecting communication path, i.e. in FIG. 9 selecting between communications paths P1 and P2, resides at the SDN node 9112. Thus, the network nodes 110,112,114,116 comprised in the communications system 100, cf. FIGS. 1A-1E, are configured to select a communication path. Further, the communications network 100 may provide optimization criterion and/or control mechanisms in order to control the selection of a communications path.

In some embodiments, the SDN node 90 is connected to the backbone network node by means of a wired or wireless connection. However, in some other embodiments, the SDN node 90 comprises the backbone network node.

Thus, a further advantage of embodiments herein is the detection of parallel communication paths to and from a user equipment, whereby the traffic may be chosen to balance the load of the communications network in an appropriate manner so that the risk of overloading some links between network nodes is reduced. Thereby long packet queues and long communication delays may be reduced or even avoided.

Although the description above contains many specifics, they should not be construed as limiting but as merely providing illustrations of some presently preferred embodiments. The technology fully encompasses other embodiments which may become apparent to those skilled in the art.

Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the described technology for it to be encompassed hereby.

When using the word "comprise" or "comprising" it shall be interpreted as non-limiting, in the meaning of consist at least of.

When using the word action/actions it shall be interpreted broadly and not to imply that the actions have to be carried out in the order mentioned. Instead, the actions may be carried out in any suitable order other than the order mentioned. Further, some action/actions may be optional.

The embodiments herein are not limited to the above described examples. Various alternatives, modifications and equivalents may be used. Therefore, the above examples should not be taken as limiting the scope of the invention, which is defined by the appending claims.

The invention claimed is:

1. A method in a first mesh node in a communication network comprising a plurality of mesh nodes, the first mesh node being directly connected to one or more downstream mesh nodes and one or more upstream mesh nodes and the method comprising:
   receiving an information list from each of the one or more downstream mesh nodes, each received information list identifying user equipments that are reachable in the downstream direction through the downstream mesh node;
   forming a combined information list by combining the received information lists with a local information list that identifies user equipments that are directly connected to the first mesh node, and sending the combined information list to each of the one or more upstream mesh nodes;
   receiving data from one of the one or more downstream mesh nodes and, in response to determining from the combined information list that the data targets a user equipment reachable through two or more downstream communication paths extending from the first mesh node through the one or more downstream mesh nodes:
   identifying a preferred one of the two more downstream communication paths, based on evaluating at least one of path loading and path signal quality; and
   sending the data in the downstream direction towards the user equipment, via the preferred downstream communication path;
   wherein any given mesh node in the communication network is downstream from the first mesh node if the first mesh node lies in a communication path going from the given mesh node to a backbone connection of the communication network, and any given mesh node in the communication network is upstream from the first mesh node if the given mesh node lies in a communication path going from the first mesh node to the backbone connection.

2. The method of claim 1, wherein identifying the preferred one of the two or more downstream communication paths comprises comparing path loads for respective ones of the two or more downstream communication paths and selecting the downstream communication path having the lowest path load as the preferred downstream communication path.

3. The method of claim 1, wherein identifying the preferred one of the two or more downstream communication paths comprises comparing path signal qualities for respective ones of the two or more downstream communication paths and selecting the downstream communication path having the highest path signal quality as the preferred downstream communication path.

4. The method of claim 1, further comprising receiving further data from one of the one or more downstream mesh nodes and, in response to determining from the combined information list that the further data targets a user equipment not reachable directly by the first mesh node and not reachable indirectly by the first mesh node through any of the one or more downstream mesh nodes, sending the further data in the upstream direction, to one of the one or more upstream mesh nodes.

5. The method of claim 1, wherein the communication network comprises a cellular radio access network, and wherein the plurality of mesh nodes comprises wireless access points, each wireless access point having a direct or indirect backhaul link to a gateway node acting as the backbone connection of the cellular radio access network.

6. An apparatus configured to operate as a first mesh node directly connected to one or more downstream mesh nodes and one or more upstream mesh nodes, within a communication network comprising a plurality of mesh nodes, the apparatus comprising:
transmitter and receiver circuitry configured for communicating with user equipments and other mesh nodes; and
a processing circuit operatively associated with the transmitter and receiver circuits and configured to:
receive an information list from each of the one or more downstream mesh nodes, each received information list identifying user equipments that are reachable in the downstream direction through the downstream mesh node;
form a combined information list by combining the received information lists with a local information list that identifies user equipments that are directly connected to the first mesh node, and send the combined information list to each of the one or more upstream mesh nodes;
receive data from one of the one or more downstream mesh nodes and, in response to determining from the combined information list that the data targets a user equipment reachable through two or more downstream communication paths extending from the first mesh node through the one or more downstream mesh nodes:
identify a preferred one of the two more downstream communication paths, based on evaluating at least one of path loading and path signal quality; and
send the data in the downstream direction towards the user equipment, via the preferred downstream communication path;
wherein any given mesh node in the communication network is downstream from the first mesh node if the first mesh node lies in a communication path going from the given mesh node to a backbone connection of the communication network, and any given mesh node in the communication network is upstream from the first mesh node if the given mesh node lies in a communication path going from the first mesh node to the backbone connection.

7. The apparatus of claim 6, wherein the processing circuitry is configured to identify the preferred one of the two or more downstream communication paths by comparing path loads for respective ones of the two or more downstream communication paths and selecting the downstream communication path having the lowest path load as the preferred downstream communication path.

8. The apparatus of claim 6, wherein the processing circuitry is configured to identify the preferred one of the two or more downstream communication paths by comparing path signal qualities for respective ones of the two or more downstream communication paths and selecting the downstream communication path having the highest path signal quality as the preferred downstream communication path.

9. The apparatus of claim 6, wherein, in response to receiving further data from one of the one or more downstream mesh nodes and determining from the combined information list that the further data targets a user equipment not reachable directly by the first mesh node and not reachable indirectly by the first mesh node through any of the one or more downstream mesh nodes, the processing circuity is configured to send the further data in the upstream direction, to one of the one or more upstream mesh nodes.

10. The apparatus of claim 6, wherein the communication network comprises a cellular radio access network and wherein the apparatus comprises a wireless access point among a plurality of wireless access points comprising the plurality of mesh nodes, each such wireless access point having a direct or indirect backhaul link to a gateway node acting as the backbone connection of the cellular radio access network.

* * * * *